Dec. 28, 1937.   V. K. ZWORYKIN   2,103,507
DIRECTION INDICATOR
Filed March 31, 1936
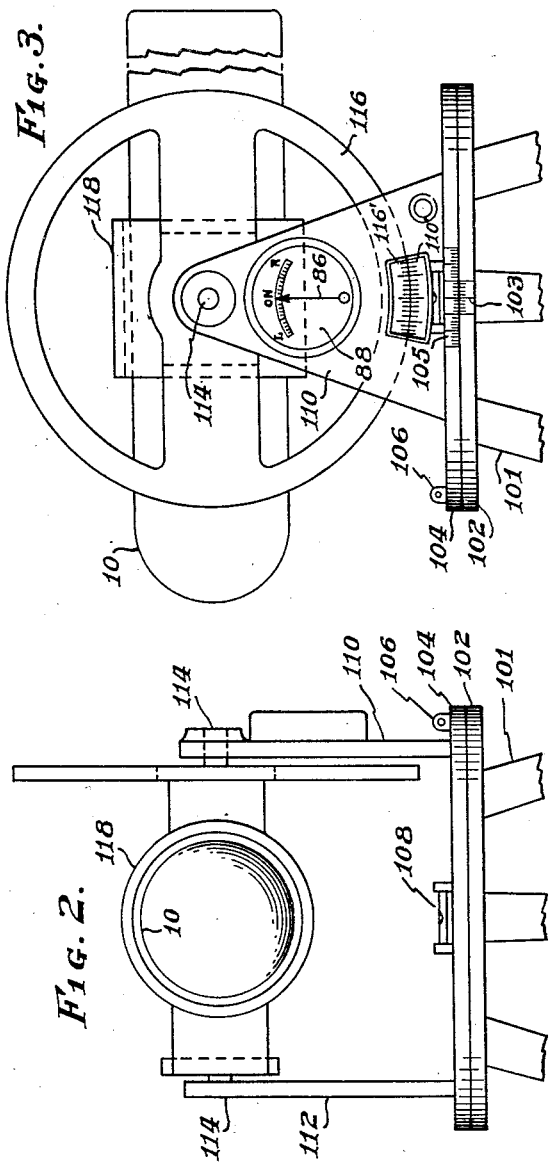
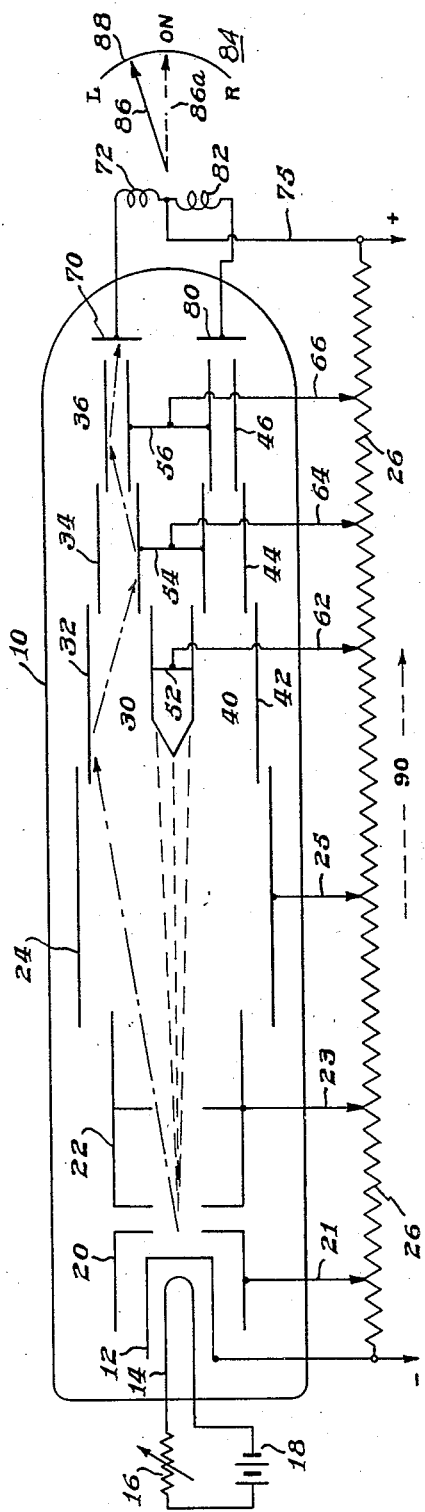
INVENTOR
Vladimir K. Zworykin
BY
ATTORNEY Patented Dec. 28, 1937

2,103,507

UNITED STATES PATENT OFFICE 2,103,507

DIRECTION INDICATOR

Vladimir K. Zworykin, Philadelphia, Pa., assignor to Radio Corporation of America, a corporation of Delaware Application March 31, 1936, Serial No. 71,982

3 Claims. (Cl. 33—204)

My invention relates to apparatus for indicating direction and has special reference to means for utilizing a kinescope, or like cathoderay device, for such purpose.

My invention is predicated upon a proper appreciation of the fact, and its application to the direction-indicator art, that when the deflecting electrodes of a kinescope are deenergized the electron-beam emanating from the cathode may be deflected. Deflection of the beam has been found to be caused by the influence of the earth's magnetic field upon the trajectories of the electons constituting the beam. The degree of deflection has been found to be a function of the speed of the electrons as well as a function of the intensity and direction of the lines of force constituting the earth's magnetic field.

The visual indication produced by such deflection of the electron beam impinging upon the fluorescent screen of a kinescope of standard dimensions is usually not a satisfactory indication of the relative direction of the earth's field. This is so because this field has but a small effect upon electrons moving at very high speeds, so that departure of the beam from "normal" is not always discernible.

It would appear that the angle of deflection might be increased to provide a more satisfactory reading by decreasing the speed of the electrons (as by lowering the voltage applied to the accelerating electrodes). Such increased angular deviation is indeed achieved by decreasing the speed of the electrons, however, to reduce the speed of the electrons is to lessen the intensity of the "spot" on the fluorescent screen so that a more satisfactory reading is not, in fact, obtainable.

An object, therefore, of my invention is to provide a method and apparatus for utilizing observed effects of the earth's magnetic field upon an electron-beam.

Another object of my invention is to provide an improved direction indicating device the operation of which is dependent upon the influence exerted by the earth's field upon a beam of electrons.

Another object of my invention is to provide a combined cathode-ray device and electron-multiplier.

Another object of my invention is to provide a tube of the type described having associated therewith an indicating device to show whether a moving craft on which the apparatus is mounted is, or is not, on the desired course, and if not to show the deviation therefrom.

Another object of my invention is to provide a course-indicator for ships, and other craft, characterized by an economy of moving parts.

Another object of my invention is to provide a geophysical magnetometer utilizing an electron-beam for indicating unsymmetrical variations in the earth's magnetic field.

Certain details of construction together with other objects of my invention will be apparent, and the invention itself will be best understood by reference to the following description and to the accompanying drawing, wherein:

Figure 1 is a diagrammatic representation of an "on-course, off-course" cathode-ray direction indicator arranged in accordance with the principle of the invention, Fig. 2 is a side elevation, and Fig. 3 is a front elevation of a mounting arrangement suitable for use with the tube and the associated indicator of Fig. 1.

The foregoing objects are accomplished in accordance with the invention by, first, producing an electron beam in an elongated highly evacuated tube. The tube is freely mounted to permit of both horizontal and vertical adjustment whereby its long axis may be positioned in a direction parallel to the earth's magnetic field. A conduit is mounted on each side of this axis, within the tube; each conduit preferably being in the form of a multi-section cylinder extending parallel to the axis and on opposite sides thereof, and each part having an open-end presented to the beam.

With the tube properly positioned the electrons will traverse a line which coincides with the tube axis, whereby the electrons are substantially equally divided, one-half of the total number of electrons entering one conduit and one-half the other. Each conduit comprises a multistage electron-multiplier so that the number of electrons passing into these cylinders will, in their travel, be usefully augmented.

The intensified, discrete, streams of electrons eventually impinge upon suitable terminal electrodes which are connected to a relay, or to an indicating device which may conveniently be constituted by a pair of oppositely wound coils balanced to produce a zero reading when the current impressed thereon through the target electrodes is exactly equal.

This condition of electrical balance will only obtain when the primary beam is equally divided between the two conduits, that is to say, when the tube is so positioned that its long axis is substantially exactly parallel to the lines of force constituting the earth's magnetic field.

Any departure from parallelism, such, for instance, as might be produced by a change in the course of the craft on which the instrument is mounted, will cause the earth's field to "cut" the electron beam and to deflect it so that instead of being equally divided between the two conduits, more electrons will enter one conduit than the other. This condition will be immediately made apparent by the indicating device, the pointer of which will be deflected in a direction determined by a predominating flow of current in that coil which is associated with the terminal electrode receiving the greater quantity of electrons from the multiplying device.

Referring now to the drawing. In carrying my invention into effect I provide an elongated highly evacuated tube 10, adjacent one end of which is an electron emitter constituted by a heater-type cathode 12 having a filament 14 adjustably energized as by means of a potentiometer 16 connected across a source 18. Three discrete accelerating electrodes comprising a grid 20, a first anode 22 and a second anode 24 are provided to give the electrons a velocity component along the tube axis. Each electrode is adapted to be maintained at a potential relatively higher than that of its next preceding electrode in the cathode direction, as by individual leads 21, 23 and 25 which are connected to a source of unidirectional potential exemplified in the drawing by a resistor 26.

Mounted on each side of the long axis of the tube and remote from the cathode is a multi-part conduit designated generally by reference numerals 30 and 40, respectively. These conduits are preferably in the form of open-ended cylinders positioned one on each side of the long axis of the tube.

Each conduit is constituted by three sections 32, 34, 36 and 42, 44 and 46 laid end to end; corresponding sections of the separate conduits being electrically connected as by shorting-bars 52, 54 and 56 which are connected through leads 62, 64, 66 to the potential source 26.

The respective sections of each conduit are preferably of successively decreasing diameter and have their end portions nested one within another as indicated in the drawing. The inner surface of each section is treated as by a deposition of caesium or the like to render it secondarily-emissive.

Two terminal electrodes, or targets, are provided. The one designated 70 is adjacent the open-end of conduit section 36, and the other, designated 80 is adjacent the open end of the opposite conduit section 46. These terminal electrodes 70 and 80 are connected together through oppositely wound coils 72, 82 of a galvanometer 84 or other indicating device the pointer 86 of which is pivoted for movement about a suitably marked scale 88 in response to a condition of electrical unbalance between the coils. The circuit to the terminal electrodes 70 and 80 is completed by lead 75 which is connected between the mid-point of coils 72—82 and the voltage source 26.

The dotted lines extending from the cathode 70 to and into the conduits show how the electron beam is split and equally divided between the two conduits 30 and 40 when the axis of the tube, and hence the beam, is substantially exactly parallel to the lines of force (indicated by the arrows 90) constituting the earth's magnetic field. The pointer of the galvanometer 84 under such condition will be pointed to the "on-course" indicaed on its dial scale 88, as shown at 86a, since the current through each coil 72, 82 is the same.

The broken lines extending from the cathode 12 to the leading conduit section 32 show how the beam is deflected when the leading end of the tube 10 is moved around in a certain direction in a horizontal plane. Here the electrons, or most of them, enter and are multiplied within conduit 30 which results in an unbalance between coils 72, 82, which is reflected in the movement of the pointer to an "off-course" position, as indicated at 86. The pointer scale 88 may be calibrated in degrees, or otherwise, to indicate the angle of departure from the desired course. Sufficient energy is supplied by the individual multipliers 30 and 40 to actuate a relay and motor (not shown). Such relay and motor may serve to actuate the rudder of the craft whereby the craft will be automatically returned to a predetermined course.

As shown in Figs. 2 and 3 a convenient way of mounting the apparatus of Fig. 1 is to provide a tripod 101 having a table or base 102. Revolvably mounted on the base 102 is a flat plate 104, the major faces of which are preferably disposed parallel to the earth's surface. Suitable leveling means, not shown, are provided for leveling the base and plate. Spirit gauges 106 and 108 on the plate 104 serve to indicate the adjustment required. The circumferential edge of the movable plate 104 is calibrated, as at 105, to indicate its angle of revolution with respect to point 103 on the base 102.

Rigidly fixed on the plate 104 and adapted to move therewith is a pair of oppositely located arms 110—112, between which axle 114, supporting a ring-like scale 116, is mounted. The tube 10 of Fig. 1 is supported on this axle as by annular sleeve 118. Calibrations 116' on the ring 116, when observed in connection with complementary markings 110' on the arm 110, indicate the angular position of the rotor relative to the horizon. The indicator 88 is conveniently mounted on arm 110.

When used as a course indicator for moving craft the craft may first be headed towards its destination at the start and the tube 10 orientated in both horizontal and vertical planes to obtain the "on-course" indication. When so adjusted any departure from the course may be corrected either manually by the pilot as dictated by his observation of the indicator or automatically by actuation of a suitable relay in the output circuit, connected as described to the rudder of the craft.

The apparatus of my invention may likewise be employed as a geophysical surveying instrument. Its use for such purpose is predicated upon the fact that the earth's field is constituted by lines of force which normally exhibit a symmetrical variation in direction and intensity according to their distance and direction from the north and south magnetic poles. Unsymmetrical local variations in the direction and intensity of the field are indicative of irregularities in rock or mineral formation below the earth's surface. By plotting these variations in the earth's magnetic field on a map of the region in question the geologist is often able to derive very valuable information regarding the lithosphere without resorting to drilling or digging. Such maps are called "isometric magnographs".

In surveying a given area with the instrument of the invention, a pole or other marker is planted and the instrument set up at a convenient distance therefrom, the geographical location of the instrument with respect to the reference point is then determined as by means of a telescope which may conveniently be mounted on the axle 114. The tube 10 is then energized and orientated horizontally and vertically on the plate 104 and axle 114 to obtain a zero reading. The angles of tilt and of revolution (as shown by scales 105' and 116', respectively) required to achieve this reading are recorded together with the location of the instrument and these several operations are repeated at other points on the terrain until sufficient information is available to plot a map or magnograph of the entire area.

The magnograph so compiled is then compared with a chart showing the normal direction of the earth's field in the latitude and longitude of the area. Discrepancies between the two maps will indicate to the surveyor the presence of subsurface irregularities in the earth's crust.

It will be apparent that the device of the present invention (relying as it does upon the inherent force of the earth's magnetic field) differs radically in principle from, and is otherwise nonanalogous to, electronic valves which employ control electrodes or grids to sway an electron beam and to thereby produce an intermittent stream of electrons which is amplified by means of multistage electron-multiplier included within the tube envelope. (See U. S. Patent 1,920,863, to Hopkin, Jr.)

Having thus described my invention, I claim:

1. In combination means for producing a beam of electrons, a pair of parallel conduits so positioned that the electrons constituting the beam are divided between the two conduits in substantially equal numbers when the beam is undeflected, a terminal electrode adjacent the end of each conduit remote from the point of electron entry, and means connecting said respective terminal electrodes in opposition to produce a balanced indication of any difference in the number of electrons impinging against the respective electrodes.

2. In combination means for producing a beam of primary electrons, a pair of parallel conduits so positioned that the electrons constituting the beam are divided between the two conduits in substantially equal amounts when the beam is parallel to the lines of force constituting the earth's magnetic field, the inner surfaces of said conduits being coated with a substance adapted to release secondary electrons by impact thereagainst of said primary electrons, a terminal electrode adjacent the end of each conduit remote from the point of electron entry and adapted to receive said secondary electrons, and means connecting said respective terminal electrodes in opposition to produce a balanced indication of any difference in the number of secondary electrons impinging against the respective electrodes.

3. The invention as set forth in claim 2 wherein each of said conduits is constituted by a plurality of coaxial sections and wherein means are provided for giving said secondary electrons a velocity component from one section to another in the direction of said terminal electrodes.

VLADIMIR K. ZWORYKIN.